Sept. 1, 1931.   V. G. APPLE   1,821,200
ELECTRIC CONTROL MECHANISM FOR VEHICLE BRAKES
Filed Aug. 8, 1928
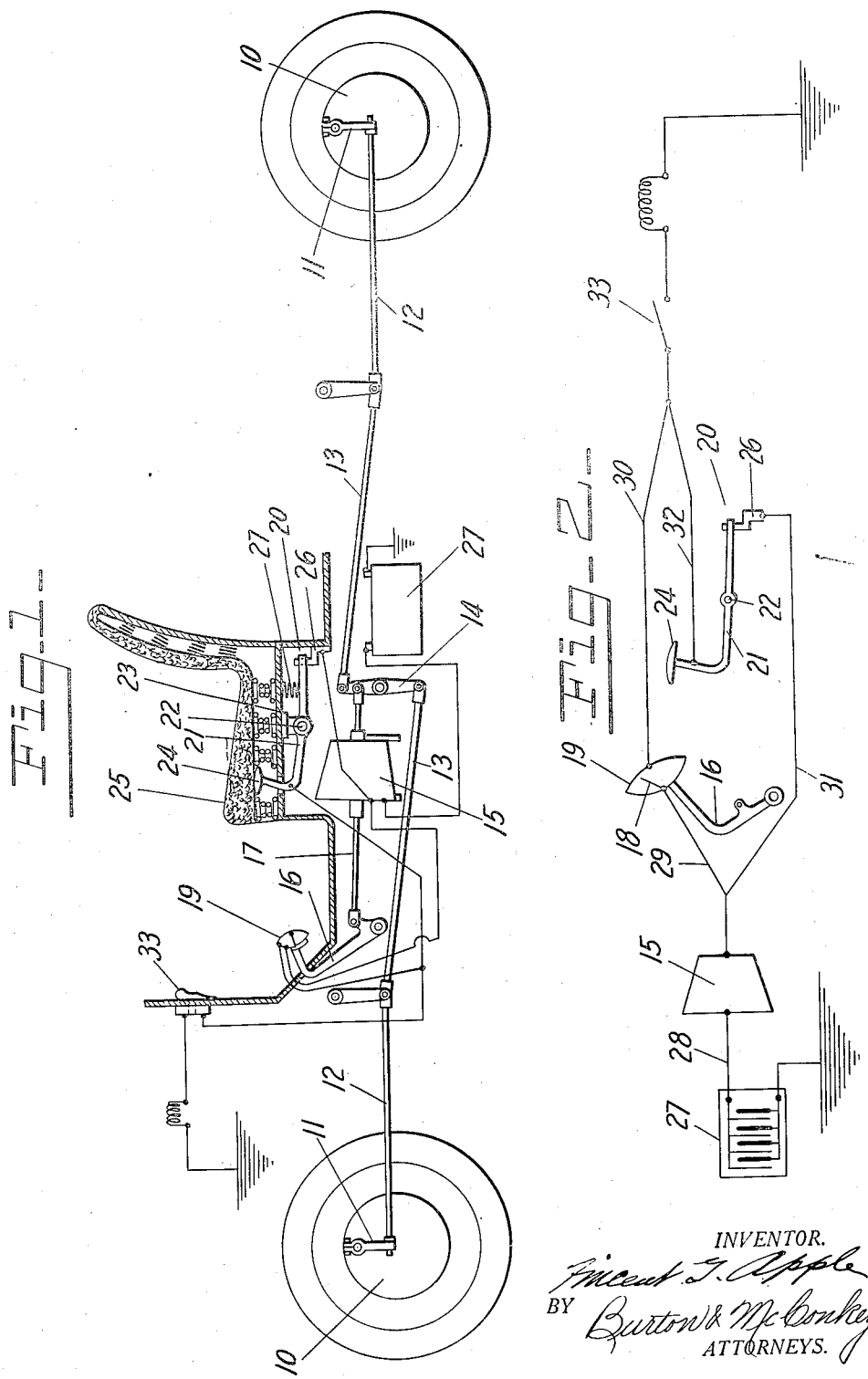
INVENTOR.
Vincent G. Apple
BY Burton & McConkey
ATTORNEYS.

Patented Sept. 1, 1931

1,821,200

UNITED STATES PATENT OFFICE

VINCENT G. APPLE, OF DAYTON, OHIO, ASSIGNOR TO BENDIX BRAKE COMPANY, OF SOUTH BEND, INDIANA, A CORPORATION OF ILLINOIS

ELECTRIC CONTROL MECHANISM FOR VEHICLE BRAKES

Application filed August 8, 1928. Serial No. 298,149.

My invention relates to improvements in electric control mechanism for vehicle brakes.

An object of the invention is the provision of means to insure greater safety in the operation of an automotive vehicle by providing for automatic application of the brakes under certain circumstances and particularly when it is impossible for the driver to apply them as, for example, if the driver were thrown from his seat during the travel of the car.

Another object is the embodiment in vehicle brake mechanism having a servo device adapted to apply the brakes of control means for the servo responsive to the position of a seat of the vehicle and normally adapted when such seat is unoccupied to permit the servo to apply the brakes but adapted upon depression of the seat under the weight of an occupant to render the servo ineffective to apply the brakes.

The above described safety devices are preferably included in electric control and operating mechanism for vehicle brakes wherein an electric power device is employed to actuate the brakes and electric control means is employed to regulate the power device; and improved features consist in the provision of manually operable mechanism to apply the brakes, electric power mechanism to apply the brakes, an ignition switch for the vehicle operable to control the said electric brake operating mechanism, a manually operable switch controlling said operating mechanism subject to the control exercised thereover by the ignition switch, and an automatically operable switch responsive to the movement of the driver's seat to control said brake operating mechanism.

The above objects and others together with various other desirable characteristics of my invention will appear more fully from the following description, appended claims and accompanying drawings, wherein—

Fig. 1 is a side elevation of a motor vehicle, parts not related to the present invention being omitted.

Fig. 2 shows the mechanism of Fig. 1 diagrammatically.

In the drawings, brakes 10, cam levers 11, rods 12 and 13, brake shaft levers 14, etc., comprise the linkage of well known mechanically operable brakes. The solenoid 15 and the combined pedal and switch 16 are described in detail in my copending applications, Serial Nos. 295,580 and 295,581, filed July 26, 1928 respectively and the manner in which the two devices combine to perform a booster or servo function appears in another copending application, Serial No. 295,578 filed July 26, 1928.

As will be seen from a consideration of these applications manual pressure on pedal 16 will be transmitted through rod 17 to apply the brakes mechanically, and if the manual pressure is so applied as to close the switch 18 (see Fig. 2) within the pedal tread 19 solenoid 15 will be energized to assist the manual effort.

In the present invention a switch 20 comprising an arm 21 hinged at 22 on bracket 23 and having a head 24 resting against the lower side of cushion 25, is normally kept in contact with terminal 26 by spring 27. But when the driver is in his place on cushion 25, head 24 is depressed and the switch is open.

When a power source 27 is properly connected in the circuit as shown, switch 20 will close to apply the brakes electrically whenever the driver raises from his seat. But in order that the current will not be on continuously during all of the time the vehicle is not occupied the circuit is returned through the ignition apparatus.

From a consideration of the diagram Fig. 2 it will be seen that current may flow from power source 27 through conductor 28 to solenoid 15 then either through conductor 29, switch 18 and conductor 30, or through conductor 31, switch 20 and conductor 32, to the ignition switch; by which arrangement current may flow through the circuit whenever the ignition switch 33 is closed providing either the driver is off his seat, or whenever pedal switch 18 and ignition switch 33 together are closed when the driver is on his seat; so that a two-fold measure of safety is provided, first because the brakes may not be applied and the current wasted when the driver is absent if the ignition is shut off and locked in the off position, and second because the brakes will operate automatically should the driver accidentally be thrown from his seat when the ignition switch is closed.

Having shown and described a means whereby the objects of my invention are attained, I claim:

1. An automotive electric safety brake control for a vehicle having brakes, a driver's seat, electro-magnetic brake applying means, a source of current supply to energize said means, and a switch to connect or disconnect said current to or from said means, said switch being adapted to be held in open position by the driver's weight on the seat, for the purpose disclosed.

2. An automotive electric safety brake control for a vehicle having brakes, a driver's seat, electro-magnetic brake applying means, a source of current supply to energize said means, two switches in parallel in the circuit either one of which will connect said current to said means when said switch is closed, the one said switch being adapted to be automatically closed when the driver's weight is removed from his seat, and the other said switch being adapted to be manually closed at will by the said driver.

3. In an automotive vehicle having a driver's seat, electric brake mechanism comprising electro-magnetic brake applying means, a power source, two conductors in parallel connecting a terminal of said means to a terminal of the power source through an ignition switch, a normally closed switch in the one conductor adapted to be opened by the weight of the driver on his seat, and a normally open switch in the other conductor adapted to be manually closed by the said driver at will.

4. A vehicle having brakes, a yieldingly supported driver's seat resistingly depressible under the weight of the driver, power means coupled with the brakes to apply the brakes, and an electric switch controlling the operation of the brakes by said power means and coupled with the seat to be actuated thereby.

5. A vehicle having brakes, a yieldingly supported driver's seat resistingly depressible under the weight of the driver, a servo device coupled with the brakes to exert brake applying pressure thereon, and mechanism responsive to the depressible movement of the seat and adapted in the normal position of the seat to permit the servo to exert brake applying pressure upon the brakes but adapted upon the depressible movement of the seat to render the servo ineffective to exert brake applying pressure upon the brakes.

6. A vehicle having brakes, a yieldingly supported driver's seat resistingly depressible under the weight of the driver, a servo device coupled with the brakes to exert brake applying pressure thereon, and means coupled with the seat to be actuated thereby upon its depression to depower the servo.

7. A vehicle having brakes, a yieldingly supported driver's seat resistingly depressible under the weight of the driver, a servo device coupled with the brakes to exert brake applying pressure thereon, a pedal to apply the brakes, means carried by the pedal operable to bring the servo into action to apply the brakes, and means coupled with the depressible seat operable to bring the servo into action to apply the brakes.

8. A vehicle having brakes, a yieldingly supported driver's seat resistingly depressible under the weight of the driver, a servo device coupled with the brakes to exert brake applying pressure thereon, a pedal to apply the brakes, means carried by the pedal operable to bring the servo into action to apply the brakes, and means coupled with the depressible seat operable to bring the servo into action to apply the brakes and manually controlled mechanism operable to render the control means carried by the pedal and the control means responsive to the depressible movement of the seat ineffective.

9. A vehicle having brakes, a yieldingly supported driver's seat resistingly depressible under the weight of the driver, a servo device coupled with the brakes to exert brake applying pressure thereon, a pedal to apply the brakes, a depressible electric switch member carried by the pedal operable to bring the servo into action to apply the brakes, a depressible electric switch member coupled with the seat normally closed when the seat is elevated to bring the servo into action to apply the brakes but adapted to be opened upon depressible movement of the seat to render the servo ineffective to apply the brakes.

10. A vehicle having brakes, a yieldingly supported driver's seat resistingly depressible under the weight of the driver, a servo device coupled with the brakes to exert brake applying pressure thereon, a pedal to apply the brakes, an electric control switch coupled with the seat, and a second electric control switch carried by the pedal arranged in parallel with the first, each switch being operable to make and break a circuit controlling the operation of the servo.

11. A vehicle having brakes, a yieldingly supported driver's seat resistingly depressible under the weight of the driver, an electric power device operable to apply the brakes arranged in a circuit with a source of electric current, a pedal to apply the brakes, a switch carried by the pedal arranged in said circuit to control the electric power device, and a second switch controlled by the depressible movement of the seat arranged in said circuit to control the electric power device.

12. A vehicle having brakes, a yieldingly supported driver's seat resistingly depressible under the weight of the driver, an electric power device arranged in a circuit with a source of electric power operable to apply the brakes, a manually operable brake applying member, a normally open electric switch in said circuit carried by the manually operable applying member and operable to control the electric power device to apply the brakes, a second switch in said circuit coupled with the seat and normally closed when the seat is in the elevated position to permit the electric power device to apply the brakes adapted to be opened upon depressible movement of the seat to render said power device ineffective to apply the brakes.

13. A vehicle having brakes, a yieldingly supported driver's seat resistingly depressible under the weight of the driver, an electric power device arranged in a circuit with a source of electric power operable to apply the brakes, an ignition switch controlling said circuit, a pedal to apply the brakes independently of the power device, a normally open electric switch in said circuit associated with said pedal and operable to bring the power device into action to apply the brakes, a normally closed electric switch in said circuit associated with said seat and adapted in the closed position to permit the power device to apply the brakes, said switch adapted to be opened by the depressible movement of the seat.

14. A vehicle having brakes, a yieldingly supported driver's seat resistingly depressible under the weight of the driver, an electric power device arranged in a circuit with a source of electric power operable to apply the brakes, a switch controlling said circuit arranged underneath the seat and responsive to the depressible movement thereof.

15. A vehicle having brakes, a spring supported seat, an electric power device arranged in a circuit with a source of electric power and operable to apply the brakes, an electric switch in said circuit arranged underneath the seat and operable thereby, said switch normally closed when the seat is elevated to permit the power device to apply the brakes and adapted to be opened by the seat under the weight of an occupant to render the power device ineffective to apply the brakes.

16. A powered vehicle having brakes, a depressible seat therein, separate power means operable to apply said brakes means responsive to the position of the seat controlling said brake power means, and means rendering said seat controlled means inoperative when the vehicle power is shut off.

17. A vehicle having an ignition switch and brakes, a movable seat therein, power means coupled with said brakes, and means responsive to the movement of said seat only when the ignition switch is closed to control the power means.

18. A vehicle having brakes, power means adapted to be coupled therewith to apply the brakes, a seat spring supported in a position of elevation and depressible under the weight of an occupant, control means operable to couple the power means with the brakes to apply the brakes when the seat is in said position of elevation and adapted to break said power connection when the seat is depressed and auxiliary control means operable when the seat is depressed to couple the power means with the brakes to apply the brakes.

19. A vehicle having brakes, power means adapted to be coupled therewith to apply the brakes, a seat spring supported in a position of elevation and depressible under the weight of an occupant, control means operable to couple the power means with the brakes to apply the brakes when the seat is in said position of elevation and adapted to break said power connection when the seat is depressed, auxiliary control means operable when the seat is depressed to couple the power means with the brakes to apply the brakes and manually operable means mechanically coupled with the brakes to apply the brakes.

20. A vehicle having brakes, power means adapted to be coupled therewith to apply the brakes, a seat spring supported in a position of elevation and depressible under the weight of an occupant, control means operable to couple the power means with the brakes to apply the brakes when the seat is in said position of elevation and auxiliary control means operable when the seat is depressed to couple the power means with the brakes to apply the brakes.

21. A vehicle having brakes, power means adapted to be coupled therewith to apply the brakes, a seat spring supported in a position of elevation and depressible under the weight of an occupant, control means operable to couple the power means with the brakes to apply the brakes when the seat is in said position of elevation and auxiliary control means operable at any position of the seat to couple the power means with the brakes to apply the brakes.

22. A vehicle having brakes, power means adapted to be coupled therewith to apply the brakes, a seat spring supported in a position of elevation and depressible under the weight of an occupant, control means operable to couple the power means with the brakes to apply the brakes when the seat is in said position of elevation and manual means operable to apply the brakes when the seat is depressed.

23. In a vehicle having brakes, power means adapted to be coupled therewith to apply the brakes, a movably supported seat, means controlled by the position of the seat controlling the coupling of the power means with the brakes to apply the brakes, and auxiliary means not controlled by the position of the seat adapted to couple the power means with the brakes to apply the brakes.

24. In a vehicle having brakes, power means adapted to be coupled therewith to apply the brakes, a movably supported seat, means controlled by the position of the seat controlling the coupling of the power means with the brakes to apply the brakes, and manually operable means coupled with the brakes not controlled by the position of the seat adapted to couple the power means with the brakes to apply the brakes.

25. A powered vehicle having brakes, operating means adapted to apply the brakes, a movably supported seat, control means responsive to the position of the seat controlling said operating means, and means rendering said seat controlled means inoperative when the vehicle power is shut off.

26. Electrically controlled brake mechanism for a motor vehicle having brakes and an ignition switch, power means to apply the brakes, a movably supported seat, control mechanism responsive to the position of the seat when the ignition switch is closed controlling the application of the brakes by the power means.

27. Brake mechanism for a motor vehicle having brakes and an ignition switch and a movably supported seat and power means adapted to be coupled with the brakes to apply the brakes, control means manually operable when the ignition switch is closed to couple the power means with the brakes to apply the brakes, control means responsive to a determined position of the seat when the ignition switch is closed to couple the power means with the brakes to apply the brakes.

28. Brake mechanism for a motor vehicle having brakes, an ignition switch, power means coupled with the brakes to apply the brakes, a movably supported seat controlling said power means when the ignition switch is closed, and manually operable means coupled with the brakes to apply the brakes.

29. Brake mechanism for a motor vehicle having brakes and an ignition switch and a movably supported seat and power means adapted to be coupled with the brakes to apply the brakes, control means responsive to a determined position of the seat when the ignition switch is closed to couple the power means with the brakes to apply the brakes, and control means manually operable to couple the power means with the brakes regardless of the position of the seat.

30. In combination with a vehicle having a motivating power means and brakes, power means adapted to be coupled with the brakes, a depressible seat yieldably supported in elevated position, means controlled by the position of said seat for coupling the power means with the brakes, and means for controlling the energization and de-energization of the motivating power means, said last control means being adapted to automatically render the seat control means inoperative on de-energization of the motivating power means.

In testimony whereof, I, VINCENT G. APPLE, sign this specification.

VINCENT G. APPLE.